July 25, 1961

H. SOODAK ET AL 2,993,850

FAST NEUTRON REACTOR

Filed June 14, 1948

Witness:
Walter L. Schlegel, Jr.

INVENTORS:
Harry Soodak
Eugene P. Wigner
BY
Roland A. Anderson
Attorney

United States Patent Office 2,993,850
Patented July 25, 1961

2,993,850
FAST NEUTRON REACTOR
Harry Soodak, Cambridge, Mass., and Eugene P. Wigner, Princeton, N.J., assignors to the United States of America as represented by the United States Atomic Energy Commission
Filed June 14, 1948, Ser. No. 32,824
6 Claims. (Cl. 204—193.2)

This invention relates to nuclear physics and more particularly to fast neutron nuclear fission chain reactors such as those described in a copending Szilard application, Serial No. 698,334, filed September 20, 1946.

As is more fully discussed in said copending application, fast neutron reactors are particularly advantageous for certain purposes due to their small size and compactness, and also due to the fact that relatively few neutrons are absorbed at high energy values in the non-fissionable components of such reactors.

It has been found that neutron absorption losses may be greatly minimized by establishing and maintaining a self-sustaining nuclear fission chain reaction while avoiding the slowing of evolved neutrons below an average energy of about 25,000 ev. At such high energies, it has been discovered that the elements of atomic number of 11 to 83, which are generally used as structural, cooling, or other elements in a reactor, have neutron absorption cross sections, which are substantially lower than their absorption cross sections for neutrons at thermal energies. In contrast, the absorption cross section for neutrons at high energies of certain heavy isotopes, such as $Th^{232}$ or $U^{238}$, which are converted to thermally fissionable isotopes upon neutron bombardment, are not so greatly reduced; and hence their tendency for neutron absorption is correspondingly higher than for lower atomic number elements. Thus, a substantial saving of neutrons may be effected by maintenance of the high energy level.

Similar advantages may accrue by operating neutronic reactors at lower energies, as for example, as low as 10 ev. or even as low as 0.3 ev., which energies are substantially above the energy of thermal neutrons at room temperature, that is about 0.03 ev. However, the higher energies of 25,000 ev. and above are preferred, inasmuch as non-moderating neutron reflectors may be utilized with reactors operating at these values. For example, $U^{238}$ and $Th^{232}$ may be utilized for this purpose, particularly in view of the fact that neutron absorption occurring in these materials results in the production of thermally fissionable materials, as for example, $94^{239}$ from $U^{238}$ and $U^{233}$ from $Th^{232}$. Such materials are called fertile materials.

Materials like $U^{238}$ when principally composed of a single chemical element, substantially all of the atoms of which having the same mass number, are generally known as isotopes. Thus, chemically pure natural uranium comprises mostly two isotopes, $U^{238}$ and $U^{235}$, in the atomic ratio of about 139 to 1. As a further example, natural occurring thorium consists exclusively of the single isotopes $Th^{232}$.

A general object of the present invention is to design an effective fast neutron reflector disposed around a fast neutron reactor to diminish neutron losses from the periphery thereof, thereby making possible a reactor of relatively small size particularly suitable for the production of power.

A more specific object of the invention is to provide a novel composite neutron reflector around a fast neutron reactor, said reflector comprising an outer portion of neutron moderator such as graphite or beryllium and an inner portion containing one or more "fertile" isotopes which are capable of scattering fast neutrons by inelastic collision therewith and which are fissionable by fast neutrons, are substantially non-fissionable by slow neutrons, and absorb or capture neutrons slow or fast to undergo nuclear reaction productive of fissionable material. For example, $Th^{232}$ and $U^{238}$ are fertile isotopes which are converted to $U^{233}$ and $Pu^{239}$ respectively by nuclear reaction resulting from neutron absorption.

The foregoing and other objects and advantages of the invention will become apparent from the following description wherein reference is made to the drawings in which.

Figure 1:
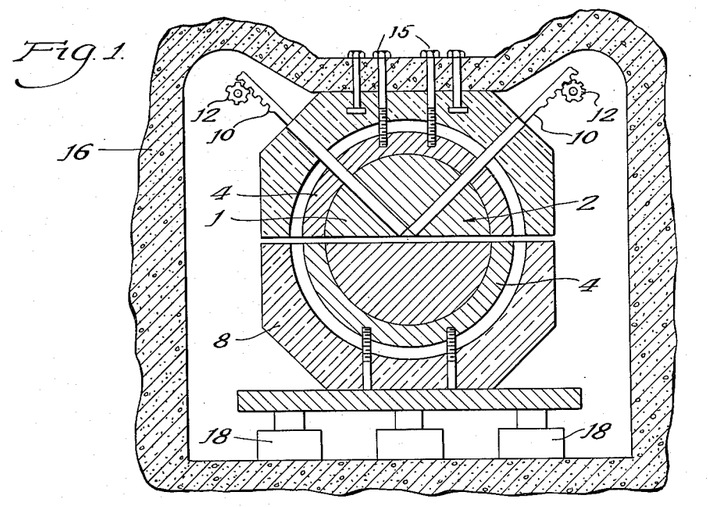
FIG. 1 is a diagrammatic central vertical sectional view partly in elevation of a fast neutron reactor embodying the invention.

Describing the invention in detail and referring first to the embodiment thereof illustrated in FIG. 1, the fast neutron reactor is generally designated 1 and comprises a reactive portion 2 containing plutonium or plutonium diluted with natural uranium. The reactive composition 2 is surrounded by a generally spherical reflector 4 formed of natural uranium of high neutronic purity which is principally composed of $U^{238}$, or other compositions comprising a fertile isotope having the characteristics heretofore set forth.

As illustrated in FIG. 1 the reactor is in the form of two hemispheres, each comprising a hemispherical core of the reactive composition 2 and an outer hemispherical reflector or blanket 4 of uranium contained within reflector 8 of neutron moderator such as beryllium or graphite preferably of high neutronic purity. Control of the nuclear fission chain reaction may be effected by the movement of the two hemispheres toward and away from each other, the maximum neutron reproduction ratio being obtained when the diametral faces of the hemispheres are disposed in juxtaposition. For adjustment of minor variations in the neutron reproduction ratio, suitable control rods 10 of neutron moderating material such as graphite or beryllium may be provided, the rods 10 being actuated by any conventional means such as rack and pinion mechanisms 12. It will be understood, as hereinafter discussed in detail, that rods 10 are inserted to increase the neutron reproduction ratio and are withdrawn to decrease the ratio or to terminate the reaction.

It may be noted that in the illustrated example of FIG. 1, the reactive composition 2 and the reflector 4 are generally spherical in form. However, if desired, other suitable shapes may be utilized. The spherical structure illustrated requires the smallest mass of plutonium to sustain the chain reaction. No moderator as such is used in the reactive core, although the neutrons may be moderated to some extent by the coolant and by other materials in the reactor as hereinafter discussed. The reactive structure is preferably enclosed within a concrete vault or shield 16 of any suitable material such as concrete, adapted to absorb biologically harmful emanations such as neutrons and alpha, beta and gamma rays, said vault affording support for the upper hemisphere of the reactor 1 by means of the bolts 15, and for a plurality of hydraulic jacks 18 which, in turn, support the lower hemisphere of the reactor 1 and are adapted to actuate the same upwardly and downwardly to afford the before-mentioned control of the chain reaction.

Figure 2:
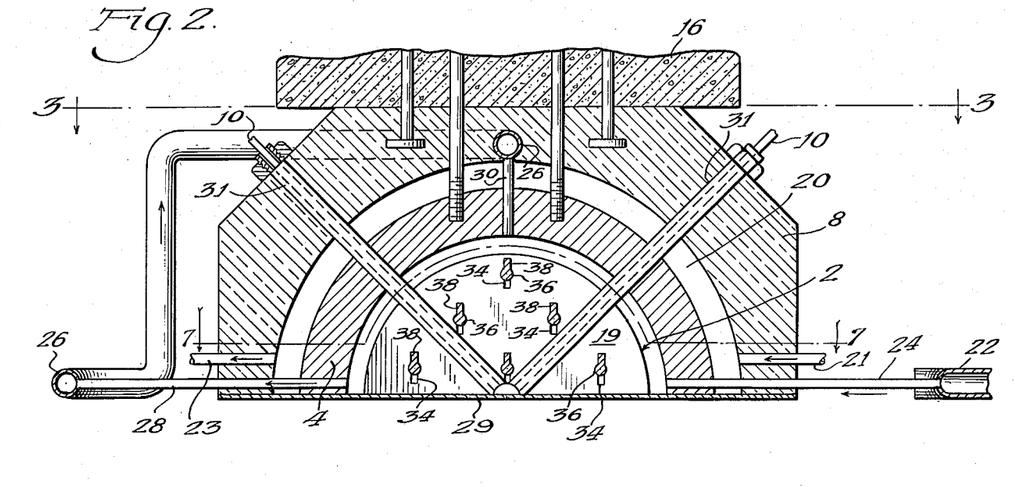
FIG. 2 is an enlarged fragmentary sectional view partly in elevation of the upper half of a pile such as that indicated in FIG. 1, illustrating a coolant system associated therewith, said view being taken on the line 2—2 of FIG. 3.
Figure 3:
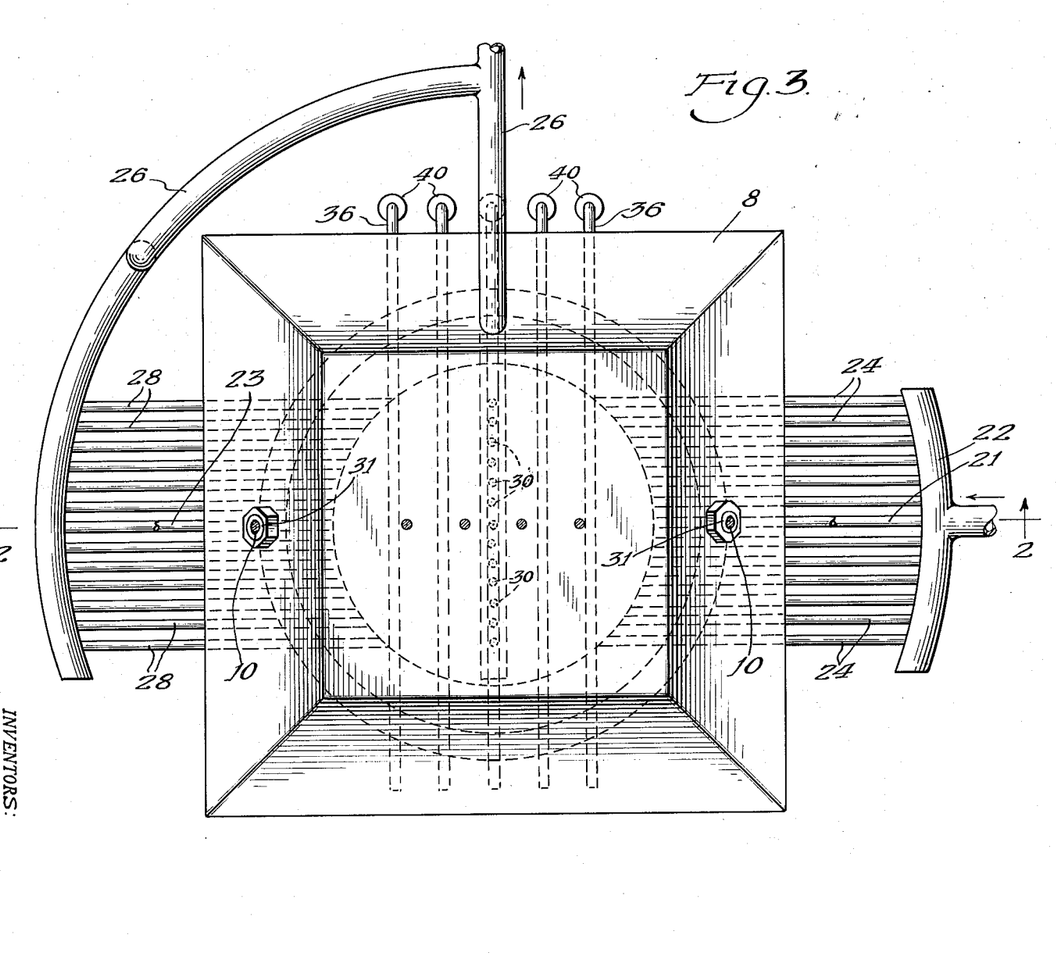
FIG. 3 is a horizontal sectional view taken on the line 3—3 of FIG. 2.

Referring next to FIGS. 2 and 3, the reactor diagrammatically illustrated in FIG. 1 is shown in some detail together with an associated coolant system adapted to absorb heat developed by the nuclear fission chain reaction, and to convey said heat from the reactor for the production of power.

FIGS. 2 and 3 illustrate the upper half of the generally spherical reactor 2, and it will be readily understood from a consideration of FIG. 1 that the lower half of the reactor is generally similar to the upper half illustrated in detail. The upper half of the reactor comprises a plurality of flat semi-circular plates 19 which are preferably of a reactive composition such as natural uranium enriched with $Pu^{239}$ or $U^{235}$, and are about 1½ to 2 millimeters in thickness. The plates 19 are preferably enclosed by a metal jacket one-quarter millimeter thick in thermal contact therewith, to protect them from the action of the associated coolant. For example, if the coolant utilized is liquid sodium or liquid bismuth, a steel jacket or coating is satisfactory for the plates 19. Instead of plates, rods and other forms of solids with coolant tubes therethrough could be used as the shape makes little difference, but a high ratio of surface area to volume is effective and desirable from the cooling standpoint inasmuch as a large surface area for given volume provides not only better contact for the coolant and better heat dissipation but also reduces internal temperature and thermal stress of the plates. Since the heat conductivity of plutonium is around 0.015 calorie per second per centimeter per degrees centigrade, it is desirable to use thin plates so as to obtain a large surface area for exposure to the coolant. The plates 19 are supported as hereinafter described on suitable rods 36 which may be of uranium or steel and are arranged in upright position and spaced apart from each other horizontally from about 1.5 to 2 millimeters so as to afford passage of coolant therebetween. The plates 19 are semi-circular discs in form with progressively smaller diameters so that when assembled, they provide a hemispherical core of plutonium or uranium-plutonium reactive composition. As mentioned, the pile does not require a moderator as such. Instead each hemispherical assemblage of plates is mounted in the uranium reflector 4 of hemispherical shape, concentric with the associated assembled plates. In the form illustrated, the uranium reflector is preferably about 30 centimeters thick and provides the container for the liquid metal coolant which is circulated among the plates, the reflector itself being cooled thereby from the inside for about half its thickness.

The uranium reflector 4, in turn, is surrounded by a chamber 20 through which a coolant such as liquid sodium or, with suitable sealing in the defining surfaces of the chamber 20, such sealing means being well-known in the art, water is circulated by inlet and outlet conduits 21 and 23 for cooling the outer portion of the reflector. The liquid metal coolant flowing between plates 19 is primarily to distribute the heat and to prevent damage to the plates and to remove the heat from the reactor. The main consideration is that it must not be moderating to any appreciable degree, hence such materials as heavy water or fluorocarbon compositions may not be used. However, non-neutron-absorbent liquid metals and gases are satisfactory. In the form illustrated, allowance is made for about 1½ to 2 millimeters of space between adjacent plates thus providing for the passage of a stream of liquid metal coolant 1 and ½ millimeters thick between each pair of adjacent plates. The coolant should have a heat capacity of around 0.3 calorie per cubic centimeter per degree centigrade and should be capable of reaching a temperature of about 400° C. higher than the coolant inlet temperature. Under such conditions it should be circulated between the plates 19 at a rate of about 10 meters per second and its absorption cross section per cubic centimeter should not exceed about ¼ that of natural uranium or about ⅟₃₀ that of plutonium.

It has been found that the liquid form of bismuth, or sodium, or a bismuth-lead eutectic composition circulated at the rate of 10 meters per second provides satisfactory cooling without too great an amount of neutron moderation or absorption. In order to circulate the coolant, a suitable inlet header 22 (FIGS. 2 and 3) is provided from which a plurality of pipes 24 extend through the graphite reflector 8, the chamber 20, and the uranium reflector 4. Liquid metal coolant is supplied through the reactor 2 by the pipes 24 at the velocity desired. In order to effect better distribution of the coolant, the pipes 24 preferably discharge respectively between adjacent plates 19. A discharge header 26 is provided and connected by suitable horizontal pipes 28 and vertical pipes 30 with the interior of the reflector 4 containing the plates 19. A similar cooling system is provided for each of the hemispherical halves of the pile. Because the lower portion of the reactor is movable, it is necessary to introduce flexible connections (not shown), for example steel bellows, in the pipes communicative with headers 22 and 26 and conducting the metal coolant from the reactor to the heat exchanger system and back. Alternatively flexible couplings may be incorporated in tubes 24 and 28 adjacent the reactor and between it and the headers, such flexible connections being required, of course, only for the lower hemisphere of the reactor to accommodate the up and down displacement thereof.

The coolant is circulated by a suitable pump (not shown) connected in a closed system with the headers, a boiler (not shown) being interposed to use the generated heat for useful power. Since the pile is made in the form of two hemispheres instead of a single sphere, for purposes of control later to be described, it is necessary to seal the diametral face of each hemisphere. For this purpose a cover plate 29 (FIG. 2) is provided for each hemisphere. The plate 29 is preferably formed of steel.

The before-mentiond control rods 10 extend through the reflector 4 into the reactor 1 through suitable wells or tubes 31 preferably formed of steel. It may be noted in this connection that the reactor 2 is preferably constructed slightly smaller than the critical size thereof, whereat a chain reaction is produced. Under these conditions the neutron reproduction ratio of the reactor is less than unity. When the control rods 10 are moved inwardly into the reactor, some of the neutrons within the reactive composition 2 are slowed or moderated, thus increasing the effectiveness thereof to fission the plutonium or $U^{235}$, inasmuch as the fission cross section thereof increases with a decrease in the energy of neutrons. This causes the neutron reproduction ratio of the reactor to rise to a value greater than unity where it may be held until the desired neutron density is attained, at which time the rods may be withdrawn until the ratio is approximately unity. The neutron density may thus be regulated and may be monitored by any conventional means not shown.

If desired, the rods 10 may be formed of fissionable material rather than the neutron moderator. Thus, by inserting the rods into the reactor, the neutron reproduction ratio thereof may be increased to a value greater than unity inasmuch as the fissionable material in the rods is effective to increase the mass of the reactor 2 within the reflector 4 to a size greater than the critical size at which the reactor is capable of sustaining a chain reaction.

For coarse control, the lower portion of the reactor 2 may be displaced relative to the upper hemisphere. When the two parts are separated, neutrons emanating from one part, which would normally enter the other, fail to do so because of escape through the gap between the hemispheres. When the two parts are placed in juxtaposition, this excess leakage or escape of neutrons is reduced so that a larger proportion of those neutrons emanating from one part will enter into the chain reaction in the other hemisphere. In this manner the reproduction ratio may be changed to a value below unity when the hemispheres are separated a maximum amount, to above unity when they are placed close together. As an example, in FIG. 1, this is accomplished by lowering and raising, respectively, the lower portion of the retractor by means of the hydraulic jacks shown schemically at numeral 18. Any other of a plurality of equivalent means well-known in the art could likewise be used, the selection of hydraulic jacks having been made for purposes of illustration only.

Figure 4:
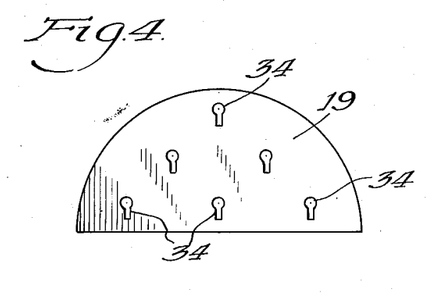
FIG. 4 is a side elevation of one of the reactive plates shown in FIG. 2.
Figure 5:
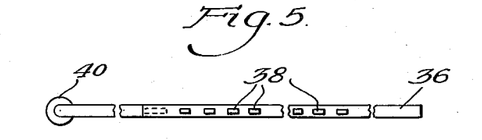
FIG. 5 is a top plan view of one of the plate retainer rods shown in FIGS. 2 and 3.
Figure 6:
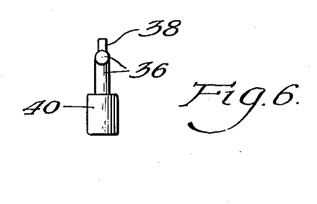
FIG. 6 is an end view of the rod shown in FIG. 5.
Figure 7:
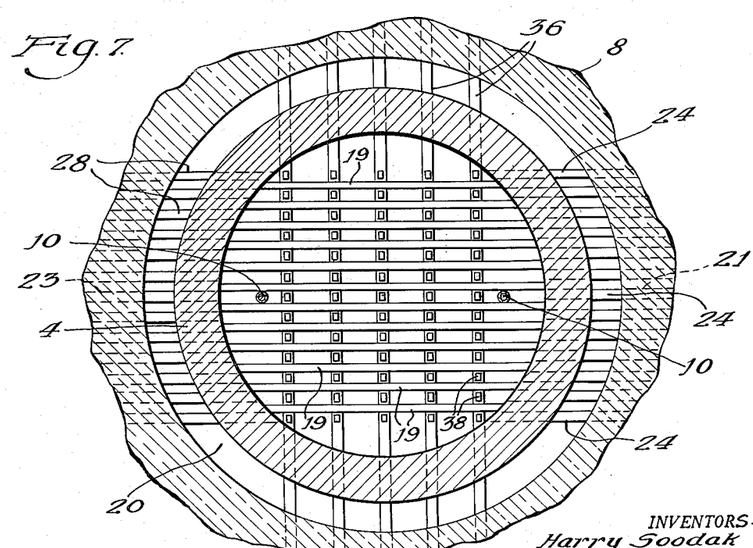
FIG. 7 is a sectional view taken on line 7—7 of FIG. 2.

As will be clearly seen in FIG. 4, each plate 19 is provided with a plurality of key shaped holes or openings 34, the openings in the respective plates being aligned to accommodate reception of support rods 36, one of which is shown in FIGS. 5 and 6. The rod 36 is formed with a plurality of lugs 38 which are disposed downwardly as the rod is inserted through the openings 34 in the plates 19. The rod 36 is then rotated so that the lugs 38 are disposed upwardly as best seen in FIG. 2, so that the lugs afford spacers for the purpose of maintaining the plates 19 in proper spaced relationship. It will be understood that each rod 36 is supported by complementary openings in the graphite reflector 8, the outer end of each rod being provided with an enlarged portion 40 functioning as a counterweight to maintain the rod 36 in the position illutsrated in FIG. 2 whereat the lugs 38 are disposed upwardly to space the plates 19.

In the above described type of fast reactor or pile it is desirable to dilute the plutonium of the reactive core with natural uranium. This dilution makes it possible to operate the reactor at a higher rate of power production in kilowatts per kilogram of plutonium because the heat conductivity of the plates 19 is increased and the heat production per unit volume of metal in the core may be maintained at a high value consistent with the ability of the coolant to extract the heat.

Table I illustrates how the reactor volume, critical weight of plutonium power obtainable, breeding ratio, and gain in plutonium vary for a cylindrical type of pile for different plutonium-natural uranium compositions, hereinafter referred to as fission metal. The values in Table I are based on reactor plates of 1.5 mm. thickness, a 0.25 mm. thick protective metal jacket enclosing said plates, a space of 1.5 mm. between plates for circulating a liquid metal coolant and a reflecting-absorbing layer of natural uranium of about 30 cm. thickness surrounding the reactor core.

TABLE I

| Ratio of Uranium Atoms to Plutonium Atoms in Reactor Plates | Reactor Volume in Liters [1] | Critical Weight of Plutonium in Kilograms | Power Obtainable in Kilowatts Per Kilogram of Plutonium | Breeding Ratio. Plutonium Atoms Gained Per Plutonium Atom Consumed | Gain of Plutonium in Grams Per Day |
|---|---|---|---|---|---|
| 0 | 2.4 | 22 | 400 | 0.8 | 6 |
| 1 | 9 | 40 | 700 | 0.7 | 18 |
| 4 | 70 | 125 | 1,500 | 0.6 | 100 |
| 10 | >1,200 | >1,000 | 1,700 | 0.4 | 7,600 |

[1] This is the sum of the volumes of fission metal, protective jacket thereon, and coolant, within the space enclosed by the natural uranium reflector-absorber.

In calculating the values of reactor volume and critical weight of plutonium in the reactor shown in Table I a "two group" method was used. The "two group" method takes into account fast neutrons, i.e. neutrons of above about 1 mev. energy, and slow neutrons, i.e., neutrons of below about 1 mev. energy. In addition the average neutron energy within the reactor is taken to be about 100,000 ev. and account is taken of the neutrons contributed by fissioning of the uranium 235 and uranium 238 isotopes of the natural uranium used as the diluent and in the reflector-absorber layer.

The values for power obtainable given in the fourth column of Table I, are based on using a liquid metal coolant having a heat capacity of about 0.3 calorie per cubic centimeter per degree centigrade. The coolant is assumed to flow in the coolant channels at a linear velocity of 10 meters per second. The maximum temperature of the fission metal is assumed to be about 400° C. higher than the inlet temperature of the coolant.

The breeding ratio values given in the fifth column of Table I are based on the nuclear properties of plutonium and uranium and take into account neutrons lost by leakage from the reactor as well as those neutrons lost by capture in the coolant and in the metallic protective jacket enclosing the fission metal. It is assumed that the coolant has an absorption cross section per cubic centimeter which is about ¼ that of natural uranium, and that the absorption cross section per cubic centimeter of the jacket metal is about ½ that of natural uranium.

Metallic sodium with a melting point of about 100° C. and having a heat capacity of about 0.27 calorie per cubic centimeter per degree centigrade may be used as a liquid metal coolant. Other suitable coolants are sodium-potassium alloys, metallic bismuth and lower melting lead-bismuth alloys.

Table II sets forth critical values for a fast reactor of spherical shape, wherein the volume of fission metal is equal to the combined volume of coolant and jacket metal employed to protect the fission metal. In this case the reactor space which is the sum of the volumes of fission metal, the coolant and the protective jacket is surrounded by a 10 centimeter thick reflector-absorber layer of natural uranium. The coolant and jacket metal are assumed to be pure neutron scatterers, having no neutron absorption and causing no neutron moderation.

TABLE II

| Ratio of Uranium Atoms to Plutonium Atoms in Reactor Plates | Reactor Volume in Liters | Critical Weight of Plutonium in Kilograms | Power Obtainable in Kilowatts Per Kilogram of Plutonium [1] |
|---|---|---|---|
| 0 | 2.2 | 20 | 200 |
| 1 | 7.6 | 35 | 500 |
| 4 | 49 | 91 | 1,200 |
| 10 | 458 | 390 | 1,700 |
| 20 | [2] | [2] | [2] |

[1] Using liquid sodium metal as the coolant, circulated at an average linear rate of 10 meters per second in a channel 2 mm. wide between reactor plates, which are 2 mm. thick and covered by a protective metal jacket ¼ mm. thick. In calculating the values in this column the effect of the protective jacket has been neglected and it is assumed that there is no neutron absorption in the sodium. The temperature of the liquid sodium is taken as 100° C. at the inlet and the maximum temperature allowable in the reactor plates is taken as 579° C.

[2] Not chain reacting.

The values given for the critical volume and critical weight as set forth in Table II have been calculated by the "two group" method as previously described in connection with Table I.

The manner in which the power obtainable varies with the average linear velocity of the coolant for a spherical type of pile (FIGS. 2 and 3, and Table II) is shown in Table III for the case of a 2 mm. thick fission metal plate protected by a ¼ mm. thick metal jacket and a 2 mm. width cooling stream employing a liquid metal coolant such as sodium.

TABLE III

| Ratio of Uranium Atoms to Plutonium Atoms in Reactor Plates | Power Produced in Kilowatts Per Kilogram of Plutonium for Varying Velocities of Coolant in Meters Per Second | | | | |
|---|---|---|---|---|---|
| | 2.5 m./sec. | 5 m./sec. | 10 m./sec. | 20 m./sec. | ∞ m./sec. |
| 0 | 160 | 190 | 210 | 220 | 230 |
| 1 | 320 | 430 | 520 | 580 | 660 |
| 4 | 550 | 860 | 1,200 | 1,500 | 2,000 |
| 10 | 590 | 1,000 | 1,700 | 2,400 | 4,500 |

Tables IV and V give the same type of information as Table III except that in Table IV the fission metal plates are 1 mm. thick and the coolant stream is 1 mm. wide, while in Table V the fission metal plates are 3 mm. thick and the coolant stream is 3 mm. wide.

TABLE IV

| Ratio of Uranium Atoms to Plutonium Atoms in Reactor Plates | Power Produced in Kilowatts Per Kilogram of Plutonium for Varying Velocities of Coolant in Meters Per Second | | | | |
|---|---|---|---|---|---|
| | 2.5 m./sec. | 5 m./sec. | 10 m./sec. | 20 m./sec. | ∞ m./sec. |
| 0 | 320 | 480 | 640 | 750 | 930 |
| 1 | 500 | 850 | 1,300 | 1,700 | 2,700 |
| 4 | 680 | 1,300 | 2,200 | 3,500 | 8,200 |
| 10 | 650 | 1,300 | 2,300 | 4,100 | 18,000 |

TABLE V

| Ratio of Uranium Atoms to Plutonium Atoms in Reactor Plates | Power Produced in Kilowatts Per Kilogram of Plutonium for Varying Velocities of Coolant in Meters Per Second | | | | |
|---|---|---|---|---|---|
| | 2.5 m./sec. | 5 m./sec. | 10 m./sec. | 20 m./sec. | ∞ m./sec. |
| 0 | 80 | 90 | 95 | 98 | 100 |
| 1 | 200 | 240 | 260 | 280 | 290 |
| 4 | 410 | 570 | 700 | 790 | 910 |
| 10 | 500 | 800 | 1,100 | 1,400 | 2,000 |

It may be seen that for fast neutron reactors of the type above described, the specific power obtainable in kilowatts per kilogram of plutonium is higher when the plutonium is diluted with natural uranium in the range of between about 4 to 10 atoms of uranium to 1 atom of plutonium, when the thickness of the fission metal plate is between about 1 mm. to 2 mm., and when the velocity of the stream of liquid metal coolant is between about 10 to 20 meters per second.

The specific power obtainable for a given rate of flow of a given coolant using plates of a given thickness of the fission metal may be varied by utilizing cooling channels that are not the same in width as the thickness of the plates. In general for coolant channels that are less in width than the thickness of the fission metal plates, the ratio of coolant volume plus protective metal jacket volume to fission metal volume will be less than 1, and the specific power obtainable will be higher than when this ratio is 1. Conversely, in the case of using coolant channels that are wider than the thickness of the fission metal plate so that the aforementioned volume ratio is greater than 1, the specific power obtainable will be less than when this ratio is 1.

In general for this type of fast neutron reactor the breeding ratio varies from about 0.9 for reactors employing undiluted plutonium in plates of about 1 mm. thickness to a value of about 0.4 for reactors employing a fission metal composition comprising plutonium and natural uranium of an atomic ratio of about 1 to 10 in the form of plates of about 3 mm. thickness. This type of fast neutron reactor produces useful power and in addition makes it possible to breed plutonium at a useful rate. For example, examination of the data set forth in the third line of Table I shows that the reactor has a power rating of 187,500 kilowatts and that the time required to double the investment of plutonium in the reactor is 1250 days at full operating power.

While the above invention is described and illustrated as employing uranium and plutonium, it is apparent that fissionable isotopes other than plutonium or a plutonium-uranium mixture may be used as the reactive composition of the core of the reactor and other fertile isotopes than uranium $U^{238}$ may be used as the reflector-absorber. As an additional example, but not in limitation of the various isotopes which may be used, the central core could be comprised of $U^{233}$ as a reactive composition and thorium could be used in the absorber reflector. In such a case there would be a production of $U^{233}$ from the thorium at a rate greater than the rate of consumption of $U^{233}$.

Figure 8:
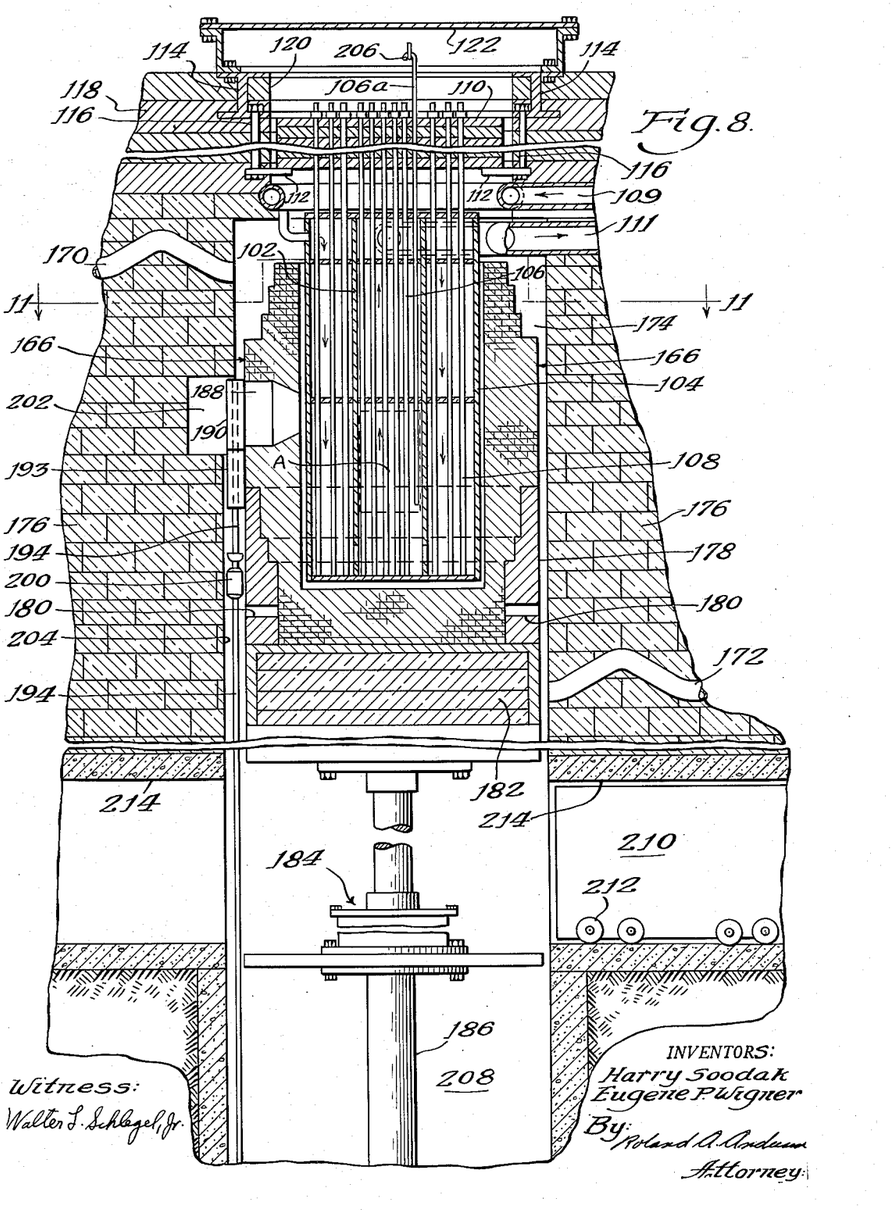
FIG. 8 is a side view of a modified reactor embodying the invention, portions of this reactor being shown in vertical section and other portions being shown in side elevation.

Referring now to FIG. 8, the system shown therein comprises inner and outer steel tanks 102 and 104, the inner tank containing a plurality of composite rods 106 and the outer tank containing a plurality of composite rods 108, all of said rods being supported, as hereinafter described in detail, from a biological shield 110 composed of any suitable material adapted to absorb biologically harmful emanations, such as neutrons and alpha, beta, and gamma rays.

The shield 110 is supported by fingers 112 connected to I beams 114 as by bolts 116. The beams being mounted within a biological shield 118 with a central opening 120 accommodating the before-mentioned shield 110. The top of the opening 120 is closed by a cover plate 122, which may be removed to accommodate assembly and disassembly of the rods 106 and 108.

Figure 12:
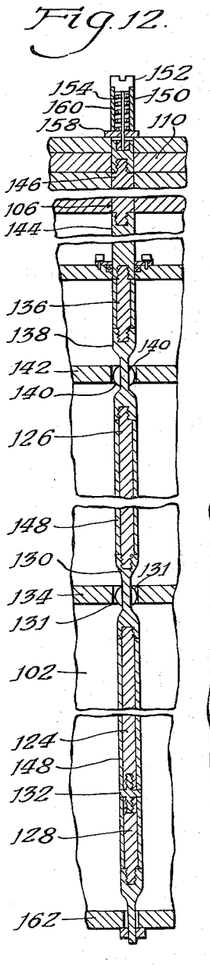

One of the rods 106 is shown in detail in FIG. 12 and comprises a cylindrical segment 124 composed of thermally fissionable material. It is disposed between cylindrical segments 126 and 128 composed principally of fertile material. The segment 124 is connected to the segments 126 and 128 by steel couplings 130 and 132, respectively, the coupling 130 being provided with spaced fins 131 adapted to center the rod 106 in an opening through a wall or partition 134 within the tank 102. The segment 126 is connected to a cylindrical beryllium segment 136 by a coupling 138 formed with fins 140 adapted to center the rod 106 in an opening within a wall 142 of the tank 102. The beryllium segment 136 is connected to an iron segment 144, which is, in turn, connected to another beryllium segment 146. The beryllium segments 136 and 146 are disposed within a biological shield 110 and form a part thereof. All of the segments are closed within thin walled tubes or sheaths 148 adapted to space the segments from a coolant circulated through the system, as hereinafter described, for the purpose of absorbing the heat of nuclear fission chain reaction.

The rod 106 is supported from the shield 110 by a spring 150 bearing against a cap 152 connected by a pin or spindle 154 at the top beryllium segment 146, said spring being seated against a spring plate 158 bearing against the top of the shield 110. The cap carries a sleeve 160 enclosing the spring 150. The spring 150 functions to place the rod 106 under tension inasmuch as the bottom thereof is interlocked to the bottom wall 162 of the tank 102. Thus, any tendency of the rod to warp due to the heat of the reaction is resisted by the tension on the rod.

Figure 11:
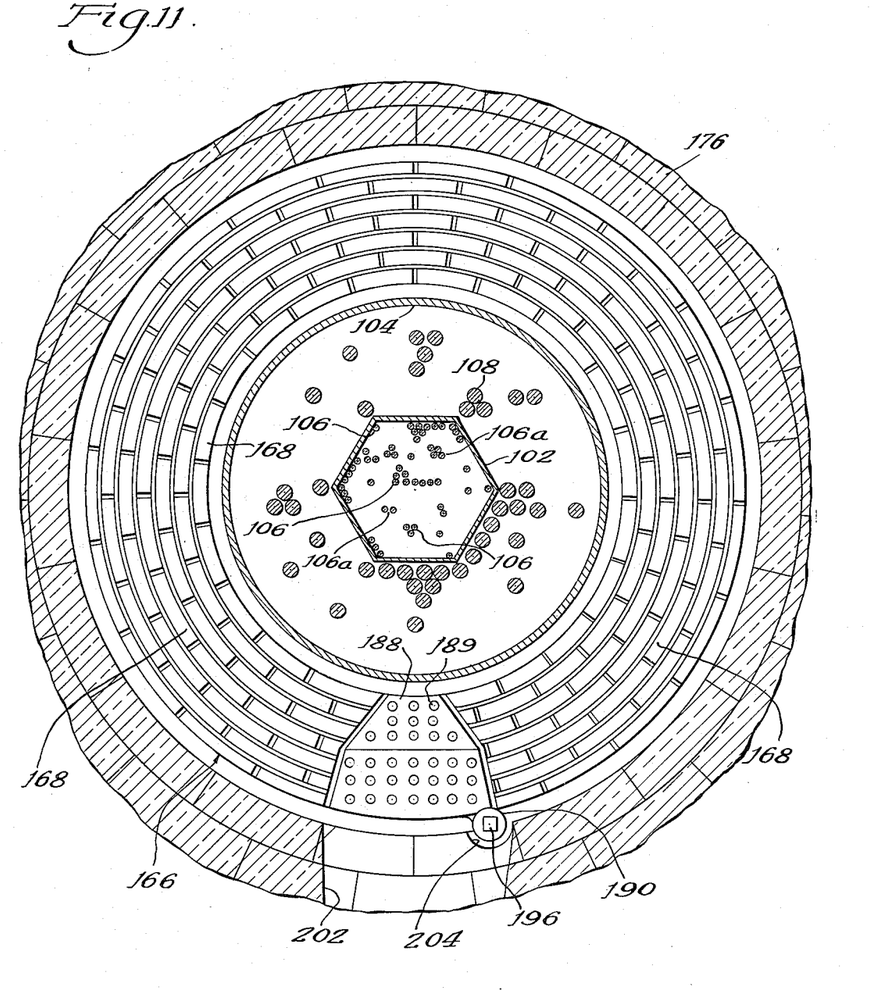
FIG. 11 is an enlarged cross sectional view taken on the line 11—11 of FIG. 8.

The rods 106 are spaced apart .046" and are disposed about .494" apart, center to center. The diameter of each segment is about .394" and the outside diameter of the jacketed segment is about .448". About 170 active rods 106 are utilized in an arrangement wherein the thermally fissionable material is substantially pure $U^{235}$. The inner tank 102, which is hexagonal is shown in FIG. 11, and is about 6.688" in width between parallel sides thereof.

Figures 9, 10, 13:
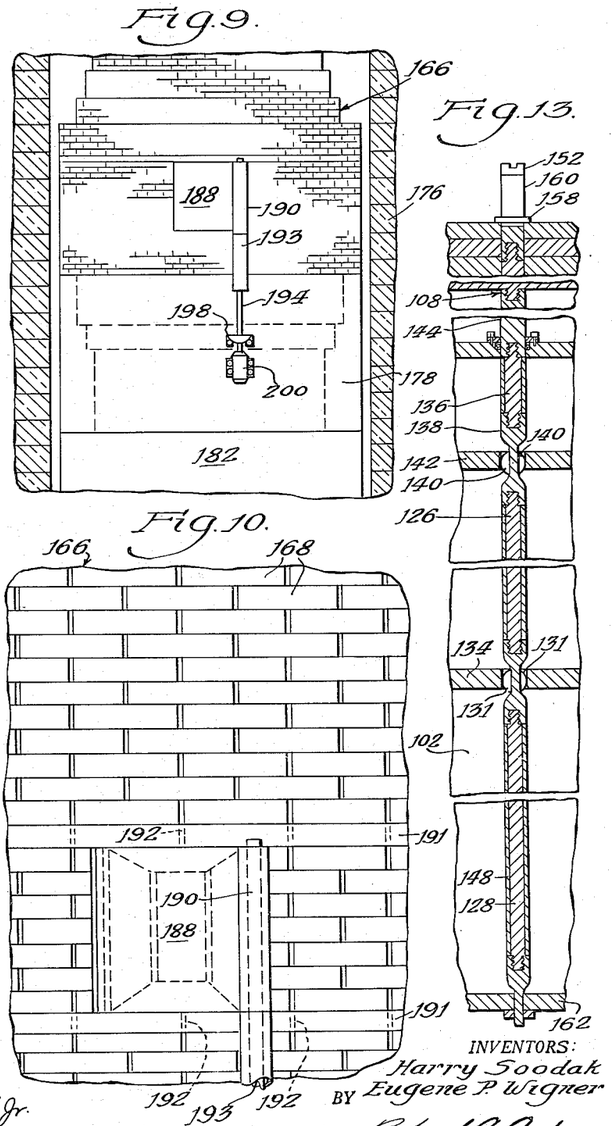
FIG. 9 is a fragmentary side elevation taken from the left as seen in FIG. 8, portions of the structure being shown in vertical section.
FIG. 10 is an enlarged fragmentary side elevation corresponding to FIG. 9.
FIGS. 12 and 13 are fragmentary vertical sectional views illustrating respectively a reactive rod and a reflector rod shown in FIGS. 8 and 11.

One of the rods 108 is shown in detail in FIG. 13 and is substantially identical with the rod 106 except for the larger diameter of the rod 108 and the elimination of the thermally fissionable segment 124. The portions of the rod 108 (FIG. 13) corresponding to those of the rod 106 (FIG. 12) are identified by corresponding numerals, and it will be seen that the bottom segment of the rod 108 containing fertile material is longer than the corresponding segment 128 of the rod 106 because of the elimination of the thermally fissionable segment 124 from the rod 108. The rods 108, as above-noted, are contained within the tank 104, and are preferably about .875" in diameter. They are spaced apart about .916" center to center, thus providing a space of about .041" between the closest portions of adjacent rods. The jackets 148 of the rods 108 as well as the rods 106 have a wall thickness of .027". In the instant embodiment of the invention one-hundred and ninety-two rods 108 are utilized.

The rods 106 and 108 are cooled by any suitable coolant such as molten bismuth or a sodium potassium alloy circulated as indicated by the arrows in FIG. 8 by inlet and outlet conduits 109 and 111. The inlet conduit is connected to the outer tank 104 and the coolant flows downwardly therethrough into the tank 102 through ports at the bottom thereof and upwardly therethrough into the outlet conduit 111. Thus, the coolant absorbs the heat of the nuclear fission chain reaction and the energy in the form of heat carried from the reactor by the coolant may be utilized for power or other purposes, if desired.

Referring again to FIG. 8, it will be seen that the thermally fissionable segments 124 of the rods 106 constitute a reactive portion indicated at A, wherein the nuclear chain reaction is sustained, said reactive portion being entirely surrounded by fertile material within the rods 106 and 108. This blanket of fertile material surrounding the reactor A not only absorbs neutrons to produce thermally fissionable material, as above discussed, but also functions as a fast neutron reflector, which reflects or scatters fast neutrons escaping from the reactor A by inelastic collision with the atoms of fertile material, thus reflecting the escaping neutrons back into the reactor to diminish neutron losses from the periphery thereof; thereby decreasing the critical size at which said reactor is capable of sustaining a chain reaction.

The reflector defined by the fertile material in the rods 106 and 108 is surrounded, except for the top thereof, by an outer reflector 166 (FIG. 8) composed principally of fertile material, as for example, bricks or blocks 168 (FIGS. 10 and 11) of neutronically pure natural uranium, the principal component of which is $U^{238}$. The blocks 168 are arranged in annular rows or series spaced radially from the longitudinal axis or center line of the tanks 102 and 104, and the blocks of each row or series are spaced apart, as best seen in FIG. 11. Each row of blocks, as best seen in FIGS. 8 and 10, comprises a plurality of horizontal layers, the spaces between the blocks of the respective layers being vertically staggered or mis-aligned, as seen in FIG. 10. Thus, the reflector 166 is provided with a multiplicity of passages defined by the space between the blocks to afford passage of a coolant such as air or helium under pressure circulated by inlet and outlet conduits 170 and 172. This coolant passes through a reaction chamber 174 containing the tanks 102 and 104 and the reflector 166, said chamber being defined by a neutron moderating reflector or blanket 176 formed, for example, of blocks of graphite or beryllium.

The reflector 166 is formed with a smaller number of the radially spaced rows of blocks 168 at the top and bottom of the reflector than at the center thereof, inasmuch as the neutron density is normally greatest in the reflector at that point. Thus, the blocks 168 are supported by a steel ring 178, the inner surface of which is stepped to accommodate the above-described arrangement of the blocks. The ring 178 is provided with one or more coolant passages 180 to accommodate flow of the before-mentioned reflector coolant between the bricks 168 constituting the bottom of the reflector 166. The ring 178 is supported by a biological shield 182 (FIG. 8) mounted on a pneumatic or hydraulic hoist 184, which is, in turn, supported by a pedestal or column 186 adapted to be raised and lowered by any suitable device, such as an hydraulic or screw hoist (not shown) for a purpose hereinafter discussed.

The nuclear fission chain reaction within the reactor A is normally controlled by a door 188 in the outer reflector 166, said door preferably being principally composed of fertile material, as for example, a block of neutronically pure natural uranium. The door is bevelled on the inner surface thereof, as clearly seen in FIGS. 8 and 11, to define angular paths with the margins of the complementary opening through the reflector 166, thus substantially preventing the escape of neutrons through said opening when the door is in its closed position as is illustrated in the drawings. The door is preferably provided with a plurality of vertical openings 189 therethrough to accommodate flow of the before-mentioned coolant, thus preventing the development of excessive heat within the door due to neutron bombardment thereof. Referring to FIG. 10, it will be seen that the blocks 168 comprising the layers immediately above and immediately below the door 188 are replaced by a pair of annular uranium plates 191, provided with openings or perforations 192 adapted to accommodate flow of the reflector coolant therethrough, said plates 191 affording a good structural support for the blocks above and at the sides of the opening through the reflector 166.

The door is provided with a hub 190 seated on a sleeve or bearing 193 mounted in any convenient manner, as for example, by welding to the ring 178 adjacent the upper edge thereof. A shaft 194 (FIGS. 8 and 9) extends through the bearing 193 and is provided with a square end 196 (FIG. 11) fitted within a complementary opening in the hub 190. The shaft extends downwardly from the bearing 193 through a conventional roller bearing unit 198 mounted on the ring 178, and the shaft is connected at its lower extremity to a motor 200 adapted to rotate the shaft, thus actuating the door to the open and closed positions thereof. The reflector 176 is provided with a recess 202 and a vertical groove 204. The recess 202 is adapted to receive the door as the latter is actuated to its open position, and the groove 204 is adapted to accommodate vertical movement of the hub 190 and bearing 193 during the elevation and lowering of the reflector 166, as hereinafter described.

It has been found that when the door 188 is open, fast neutrons escaping therethrough are scattered through the reaction chamber 174 and are slowed by elastic collision with the atoms of neutron moderator constituting the reflector 176. Thus, the slowed neutrons are unable to penetrate the fertile material constituting the inner and outer reflectors around the reactor A, and are, for the most part, absorbed by this fertile material or by the wall of the outer tank 104. This loss of neutrons reduces the neutron reproduction ratio of the reactor A and thus, by adjusting the door 108, this ratio may be brought to values above and below unity, thereby accommodating regulation of the neutron density within the system. It will be understood that while one relatively large door 188 is illustrated in the drawings, if desired, any number of such doors of any suitable size may be utilized for the purpose of regulating the reaction.

Emergency control may be effected by dropping the reflector 166 by means of the hoist 184 or, if desired, emergency control may be achieved by elevating one or more of the reactive rods within the tank 102, said rods being designated at 106a in FIGS. 8 and 11; and being identical with the rods 106, except that they are not secured to the bottom wall of the tank 102. Each rod 106a is provided with a coupling 206 (FIG. 8) at its upper extremity for convenient connection to an actuating mechanism (not shown) supported, for example, by the cover plate 122.

It will be understood that from time to time it is desirable to remove the blocks 168 constituting the outer reflector 166, and this is accomplished by actuating the hoist 184 and the column 186 to lower the reflector 166 into a handling chamber 208, whereupon a biological shield 210 is moved, as for example, by means of a wheel 212 through a chamber 214 to a position beneath the reaction tank 104 and above the handling chamber 208. Thereafter the reflector 166 may be disassembled for the purpose of recovering the thermally fissionable material formed within the blocks 168 and a new reflector may be assembled on the ring 178, and may be elevated therewith into position around the reaction tank 104, as shown in FIGS. 8 and 9.

Assuming that the thermally fissionable segments 124 are composed of $U^{235}$, the amount required for the above-described reactor is determined by the concentration of this isotope in the segments. If the segments 124 are formed of enriched uranium containing $U^{235}$ in concentration of the order of 90 percent, the total amount of enriched uranium would be about 45 kilograms containing about 40 kilograms of $U^{235}$. Under certain circumstances wherein it is desirable to raise the number of kilowatts per kilogram of $U^{235}$, it may be desirable to use this material in more dilute form. For example, enriched uranium containing $U^{235}$ in concentration of the order of 35 percent would sustain a reaction in a device such as above-described if 100 kilograms of $U^{235}$ were provided in the reactor. However, the breeding gain and neutron loss in the coolant would not be materially changed by utilizing $U^{235}$ in greater dilution. It may be noted that a smaller quantity of $Pu^{239}$ in the reactor A would be necessary to sustain a reaction, all other factors being equal, inasmuch as a greater number of neutrons are emitted on the average by plutonium atoms during fissioning thereof than are emitted by $U^{235}$ atoms.

Reactors of the above-described type, as more fully discussed in said copending Szilard application, operate at an average neutron energy at least above about 0.3 ev. and preferably above about 25,000 ev., the average energy being largely dependent upon the moderating properties of the coolant and of the structural nonfissionable components of the reactor, as will be readily understood by those skilled in the art. The specific embodiments disclosed operate at an average neutron energy considerably in excess of 25,000 ev.

For an estimation of the breeding gain in thermally fissionable material, the geometry of the reactor and the pertinent nuclear constants must be considered. The following estimates have been made for the above geometry using reasonable values of the nuclear constants based on actual measurements:

INTERNAL PORTION OF REACTOR

| Material | Relative Volume of Components | Relative Neutron Absorption |
|---|---|---|
| $U^{235}$ | 1 | 1 |
| Fe | 0.4 | 0.01 |
| Na-K alloy (50% by wgt. of each) | 0.4 | 0.0 |

REACTOR BLANKET

| Material | Relative Volume of Components | Relative Neutron Absorption |
|---|---|---|
| Natural Uranium | 1 | 1 |
| Fe | 0.4 | 0.08 |
| Na-K alloy (50% by wgt. of each) | 0.4 | 0.01 |

In the above tables, are listed in the first column the materials of the reactor and in the second column the relative volumes of these materials in terms of the volume of $U^{235}$ and natural uranium in the first and second tables, respectively. The third column indicates the relative number of neutrons absorbed by the various components. It is to be noted that in the reactor proper the absorption of neutrons due to the iron and due to the sodium potassium in the coolant alloy is negligible compared to the neutrons absorbed by the $U^{235}$. This is not true, however, for the reflector, and it is believed that the numbers given in the table for the fraction of neutrons absorbed in the iron and in the alloy coolant in the reflector are high since these calculations assume that all of the blanket is iron jacketed and cooled by the alloy. As above-described, however, the outer reflector 166 is so designed that neither iron nor cooling metal will be present. The other serious loss of neutrons from the reactor is in the upper direction where channels are provided for removing the rods from the device. It may be noted that by lengthening the segments 126 of these rods sufficiently that the loss in this direction can be held down to that estimated for the other parts of the reflector. For the conditions outlined here the breeding gain is estimated to be between 0.15 and 0.2. More explicitly, this means that for each $U^{235}$ atom consumed between 1.15 and 1.2 new $Pu^{239}$ atoms are generated. It should be pointed out that for most purposes concerning the chain reaction $Pu^{239}$ is considerably more effective or more valuable than $U^{235}$, so that more is gained by this conversion than is indicated by these numbers.

It will also be apparent that the reactor shown in the above figures comprises a central active region surrounded by a blanket of thorium or uranium which blanket itself is surrounded by a second blanket comprising a neutron moderator capable of slowing neutrons to substantial neutron energies such as carbon, water, deuterium oxide, beryllium or other elements of low thermal neutron cross-section and atomic numbers below about 10. The thorium or uranium blanket not only serves as a fast neutron reflector as above described, but also functions in the nature of a filter or screen for most neutrons of relatively low energies, for example, 0.01 to 10 electron volts. Thus, the fast neutrons leaving the central active area are either reflected or captured by the blanket or passed through the blanket into the neutron moderator where they are slowed to low energies, usually thermal energies. These low energy neutrons are then available for breeding purposes.

Since the critical size of the reactor operating by virtue of thermal neutrons is substantially smaller than the critical size of a reactor operating by virtue of fast neutrons, that is, for example, of the order 100,000 ev. or above, it is usually desirable to prevent or minimize the return of thermal neutrons into the active area. This is also desirable to minimize the problems of radioactivity hazards in connection with the coolant system and the like. The uranium or thorium blanket serves this function and absorbs most of the thermal neutrons which are reflected inwardly from the neutron moderator blanket.

It will be understood that other means may be utilized to prevent or minimize the return of slow or thermal neutrons into the central fast neutron active area, for example, a blanket of cadmium, barium, gadolinium or other isotopes having a high neutron capture cross-section for slow neutrons may be provided between the active area and the neutron moderating blanket for this purpose. Likewise, numerous other high neutron absorbers usually having an atomic number below about 80 may be used for this purpose.

It will be understood that the present invention is not restricted to the specific embodiments disclosed or to the theories of nuclear physics set forth, inasmuch as many modifications of these embodiments may be conceived by those skilled in the art without departing from the spirit of the invention or the scope of the appended claims; and experimental data later discovered may modify the theories set forth without affecting the operativeness of the invention disclosed.

What is claimed is:

1. A neutronic reactor which comprises fissionable material in amount sufficient to be capable of sustaining a nuclear fission chain reaction and in concentration sufficiently high so that the average neutron energy within the reactor is at least about 25,000 ev., a natural uranium blanket substantially surrounding the reactor, and a reflector formed of a neutron moderator around the blanket capable of moderating fast neutrons to thermal energies of about 0.03 ev., said reflector being substantially free from neutron poison, said blanket being sufficiently thick to substantially eliminate flow of neutrons therethrough from said moderator.

2. A neutronic reactor according to claim 1 wherein the fissionable material is undiluted plutonium, the reactor is cylindrical, the reactor critical volume is 2.4 liters, the critical weight of plutonium is 22 kg., and the thickness of the blanket is 30 cm.

3. A neutronic reactor according to claim 1 wherein the fissionable material is plutonium diluted in a 1:1 proportion with natural uranium, the reactor is cylindrical, the reactor critical volume is 9 liters, the critical weight is 40 kg. and the thickness of the blanket is 30 cm.

4. A neutronic reactor according to claim 1 wherein the fissionable material is plutonium diluted in a 4:1 proportion with natural uranium, the reactor is cylindrical, the reactor critical volume is 70 liters, the critical weight is 125 kg. and the thickness of the blanket is 30 cm.

5. A neutronic reactor according to claim 1 wherein the fissionable material is undiluted plutonium, the reactor is spherical, the reactor critical volume is 2.2 liters, the critical weight of plutonium is 20 kg. and the thickness of the blanket is 10 cm.

6. A neutronic reactor according to claim 1 wherein the fissionable material is plutonium diluted in a 1:1 proportion with natural uranium, the reactor is spherical, the reactor critical volume is 7.6 liters, the critical weight is 35 kg. and the thickness of the blanket is 10 cm.

References Cited in the file of this patent

UNITED STATES PATENTS

| | | |
|---|---|---|
| 1,019,394 | Weintraub | Mar. 5, 1912 |
| 2,708,656 | Fermi et al. | May 17, 1955 |
| 2,815,319 | Snell | Dec. 3, 1957 |

FOREIGN PATENTS

| | | |
|---|---|---|
| 861,390 | France | Feb. 7, 1941 |
| 114,150 | Australia | May 2, 1940 |
| 114,151 | Australia | May 3, 1940 |
| 233,011 | Switzerland | Oct. 2, 1944 |

OTHER REFERENCES

Goodman: "The Science and Engineering of Nuclear Power," pp. 274, 278, 302, and 303, Addison-Wesley Press, Inc. (1947).

Smyth: "Atomic Energy for Military Purposes," page 50, August 1945.

Kelly et al.: Physical Review, 73, 1135–9 (1948).